(12) United States Patent
Stellacci et al.

(10) Patent No.: US 7,597,950 B1
(45) Date of Patent: Oct. 6, 2009

(54) NANOPARTICLES HAVING SUB-NANOMETER FEATURES

(75) Inventors: Francesco Stellacci, Somerville, MA (US); Alicia M. Jackson, Washington, DC (US)

(73) Assignee: Massachusetts Institute of Technology, Cambridge, MA (US)

( * ) Notice: Subject to any disclaimer, the term of this patent is extended or adjusted under 35 U.S.C. 154(b) by 374 days.

(21) Appl. No.: 11/363,907

(22) Filed: Feb. 28, 2006

Related U.S. Application Data (60) Provisional application No. 60/657,267, filed on Feb. 28, 2005.

(51) Int. Cl.
*B32B 5/16* (2006.01)
*B05D 7/00* (2006.01)

(52) U.S. Cl. .................. 428/144; 427/212; 427/215; 427/220; 427/222; 427/299; 427/307; 428/323; 428/403; 428/687

(58) Field of Classification Search .................. 427/212, 427/215, 220, 222, 299, 307; 428/323, 144, 428/403, 687; 977/773, 774
See application file for complete search history.

(56) References Cited

U.S. PATENT DOCUMENTS

| 5,514,501 | A | * | 5/1996 | Tarlov ........................... 430/5 |
| 5,609,907 | A | * | 3/1997 | Natan ........................ 427/2.12 |
| 5,686,549 | A | * | 11/1997 | Grainger et al. .............. 528/25 |
| 5,922,214 | A | | 7/1999 | Liu et al. |
| 5,965,305 | A | * | 10/1999 | Ligler et al. .................. 430/17 |
| 6,127,129 | A | * | 10/2000 | Corn et al. ..................... 435/6 |
| 6,235,340 | B1 | * | 5/2001 | Lee et al. .................. 427/2.12 |
| 6,471,761 | B2 | | 10/2002 | Fan et al. |
| 6,518,194 | B2 | | 2/2003 | Winningham et al. |
| 6,656,568 | B1 | * | 12/2003 | Winningham et al. ....... 428/145 |
| 7,160,583 | B2 | * | 1/2007 | Frey et al. .................... 427/437 |
| 7,427,410 | B2 | * | 9/2008 | Hubbell et al. .............. 424/423 |
| 2003/0068446 | A1 | | 4/2003 | Mirkin et al. |
| 2003/0091752 | A1 | | 5/2003 | Nealey et al. |
| 2003/0156319 | A1 | | 8/2003 | John et al. |
| 2003/0180472 | A1 | | 9/2003 | Zhou et al. |
| 2005/0221081 | A1 | * | 10/2005 | Liu et al. .................... 428/338 |
| 2006/0068090 | A1 | * | 3/2006 | Monbouquette et al. .... 427/180 |

OTHER PUBLICATIONS

Braun (2004) "Spontaneous ligand organization" Nature Materials, vol. 3, 281-282.

Hostetler, et al (1999) "Dynamics of Place-Exchange Reactions on Monolayer-Protected Gold Cluster Molecules." Langmuir, vol. 15, No. 11 3782-3789.

(Continued)

*Primary Examiner*—H. (Holly) T Le
(74) *Attorney, Agent, or Firm*—Pearl Cohen Zedek Latzer LLP; Mark Cohen (57) ABSTRACT

An article has a surface, at least a portion of which has a local radius of curvature of about 1000 nm or less. For example, the article may be a nanoparticle or a surface, a portion of which has a roughness characterized by a radius of curvature of about 1000 nm or less. A monolayer coating disposed on the surface includes a plurality of ligands organized into ordered domains having a characteristic size of less than or about equal to 10 nm.

21 Claims, 3 Drawing Sheets
(3 of 3 Drawing Sheet(s) Filed in Color)

OTHER PUBLICATIONS

Hosun, et al (2003) "Synthesis of mixed Monoplayer-Protected Gold Clusters from Thiol mixtures: Variation in the Tail Group, Chain Length and Solvent." Langmuir 19, 8555-8559.

Ingram, et al (1997) "Poly-hetero-w-functionalized Alkanethiolate-Stabilized Gold Cluster Compounds." J Am Chem Soc, 119, 9175-9178.

Jasckson, et al (2004) "Spontaneous assembly of subnanometre-ordered domains in the ligand shell of monolayer-protected nanoparticles." Nature Materials, vol. 3, 330-336.

Malinsky, et al (2001) "Chain length dependence and Sensing Capabilities of the Localized Surface Plasmon Resonance of Silver Nanoparticles Chemically modified with Alkanethiol Self Assembled Monolayers." J Am Chem Soc, 123, 1471-1482.

Shamblott, et al (2001) "Human embryonic germ cell derivatives express a broad range of developmentally distinct markers and proliferate extensively in vitro." PNAS vol. 98, No. 1, 113-118.

Templeton, et al (2000) "Monolayer-Protected Cluster Molecules." Acc. Chem. Res. vol. 33, 27-36.

Wary (2003) "Signaling through Raf-I in the neo vasculature and Target Validation by Nanoparticles." Molecular Cancer 1-4.

Young-Seok, et al (2001) "Unsymmetrical Disulfides and Thiol Mixtures Produce Different Mixed Monolayer-Protected Gold Clusters" Langmuir, 17, 7735-7741.

Young-Seok, et al (2003) "Organic reactions of monolayer-protected metal nanoparticles." CR Chimie 1009-1018.

* cited by examiner

NANOPARTICLES HAVING SUB-NANOMETER FEATURES

RELATED APPLICATIONS

This application claims priority to provisional application Ser. No. 60/657,267 filed Feb. 28, 2005 the contents of which are incorporated herein by reference.

FIELD OF THE INVENTION

The present invention relates to nanoparticles having sub-nanometer surface features, and in particular to monolayer-protected nanoparticles that exhibit spontaneous assembly of ordered surface domains.

BACKGROUND OF THE INVENTION

Protein adsorption is a limiting factor for materials in a wide range of applications, from aquaculture to surgical implements to biosensors. In all of these and many other areas, adsorption of proteins or "biofouling" can impair or destroy effectiveness, for example through the creation of biofilms (or "slime"). A variety of techniques have been used to limit biofouling, depending on the severity of the problem and the cost of the materials. These techniques include regularly disposing of implements (e.g., toothbrushes), treating with heat and/or chemicals to denature and remove proteins (e.g., surgical instruments), and coating with "non-stick" materials that limit the adsorption of proteins (e.g., surgical implants and ocean-going vessels). However, in many applications, instruments and sensors cannot be readily replaced or cleaned, and current materials that limit protein adsorption are limited and often include toxic components. A need thus exists for additional methods of rendering surfaces resistant to protein adsorption.

SUMMARY OF THE INVENTION

The present invention provides novel materials that are resistant to protein adsorption, and methods of increasing the resistance of existing materials to biofouling.

In one aspect, the invention is a monolayer-protected article. An article has a surface, at least a portion of which has a local radius of curvature of about 1,000 nm or less and a monolayer coating on the portion. The monolayer includes a plurality of ligands organized into ordered domains having a characteristic size of less than or about equal to 10 nm. For example, the portion may have a radius of curvature of between about 1 and about 10 nm, between about 10 and about 100 nm, or between about 100 and about 1,000 nm. The characteristic size may be between about 0.2 and about 1 nm, between about 1 nm and about 5 nm or between about 5 nm and about 100 nm. The article may be a nanoparticle, and the surface may be textured. The ordered domains may define parallel strips or a mosaic of roughly hexagonal domains on the portion.

The monolayer coating may include two ligands differing in length by not more than the length of chain of 10 methylene groups. The ligands may be independently selected from mercaptopropionic acid, mercapto undecanoic acid, 4-amino thiophenol, hexanethiol, octanethiol, decanethiol, and duodecanethiol. Each ligand may be connected to the portion by a chemical group independently selected from silane, carboxylate, thiol, phosphonate, nitrile, isonitrile, hydroxamate, acid chloride, anhydride, sulfonyl, phosphoryl, hydroxyl, and an amino acid. Each ligand may include an endgroup independently characterized by one or more of ionic, non-ionic, polar, non-polar, halogenated, alkyl, alkenyl, alkynyl, and aryl and a tether independently characterized by one or more of polar, non-polar, halogenated, positively charged, negatively charged, and uncharged. For example, the tether may be a saturated or unsaturated, linear or branched alkyl group or aromatic group.

The monolayer coating may include two ligands that, when deposited as self assembled monolayers on a flat surface, exhibit contact angles with water that differ at least 1 degree, at least 3 degrees, at least 5 degrees, or at least 7 degrees. At least two members of the plurality of ligands may have differing hydrophilicities. The monolayer-protected surface may be resistant to non-specific protein absorption. The portion may include a metal, a semiconductor material, a polymer, a ceramic, or a composite of any of these.

In another aspect the invention is a method of creating a monolayer-protected surface. The method includes providing a surface having a local radius of curvature of less than or about equal to 100 nm and attaching a first ligand and a second ligand to the surface. The first and second ligands are selected and attached so as to form domains having a characteristic size of less than or about equal to 10 nm. Providing a surface may include providing a textured surface, and providing a textured surface may include sanding, chemical etching, sandblasting, or dewetting. Providing a surface may include plasma etching the surface to generate hydroxyl groups.

BRIEF DESCRIPTION OF THE DRAWING

The patent or application file contains at least one drawing executed in color. Copies of this patent or patent application publication with color drawings will be provided by the Office upon request and payment of the necessary fee.

The invention is described with reference to the several figures of the drawing, in which, FIG. 1(a) is a diagram of ligand configuration in a "ripple" pattern, while

DETAILED DESCRIPTION

Nanoparticles, nanowires, and nanotubes have recently attracted intensive research interest because of the uniqueness and ease in tailorability of their properties. Similarly, nanostructured materials have shown improved properties (for example, the mechanical behavior of nanostructured metals, as described in Schiotz, et al., "Softening of nanocrystalline metals at very small grain sizes," Nature 391:561-563, 1998, incorporated herein by reference), as well as new ones (for example, the creation of a photonic bandgap in a block copolymer because of domain ordering, as described in Lauhon, et al., "Epitaxial core-shell and core-multishell nanowire heterostructures," Nature 420:57-61, 2002, incorporated herein by reference). We have found that a combination of nanostructure sizes, exemplified by monolayer-protected nanoparticles (MPNPs) and monolayer-protected nanosurfaces (MPNSs) with phase-separated ordered domains in their ligand shells, provide unique properties, such as non-specific adsorption of proteins.

Self-assembled monolayers (SAMs) are monomolecular layers on surfaces that typically provide additional properties: for example, specific surface energies and opto-electronic behavior. SAMs composed of a mixture of ligands can be produced in either one step, by absorption from a solution of different molecules, or in two steps, by placing a preformed monolayer into a solution of a different ligand. Scanning tunneling microscope (STM) images have shown that some mixed SAMs present phase-separated domains, but with no particular order.

MPNPs are supramolecular assemblies composed of a nanosized core particle (typically metallic) and an outer ligand shell, that is, a SAM on the particle surface. These particles show unique properties due to their core (for example, surface plasmon absorption, as described in Link, et al., "Spectral properties and relaxation dynamics of surface plasmon electronic oscillations in gold and silver nanodots and nanorods," *J. Phys. Chem. B,* 103:8410-8426, 1999, incorporated herein by reference), to their ligands (solubility, as described in Templeton, et al., "Monolayer protected cluster molecules,"*Acc. Chem. Res.* 33:27-36, 2000, incorporated herein by reference), or to both of their components (single electron transistor, as described in Andres, et al., "'Coulomb staircase' at room temperature in a self-assembled monolayer on Au{111}," *Science* 272:1323-1325, 1996, incorporated herein by reference). They have been synthesized by known methods; in particular, the Schriffin method, described in Brust, et al., "Synthesis of thiol-derivatized gold nanoparticles in a 2-phase liquid-liquid system,"*J. Chem. Soc. Chem. Commun.* 1994:801-802 (incorporated herein by reference), allows for straightforward control over the core size and ligand nature. We have developed new, related methods—using one or two steps—that lead to the synthesis of nanoparticles coated with a mixed SAM having subnanometer-ordered domains (see also Jackson, et al., "Spontaneous assembly of subnanometer-ordered domains in the ligand shell of monolayer-protected nanoparticles," *Nature Mat.* 3:330-336, 2004, incorporated herein by reference).

Substrate Materials

As discussed above, both nanoparticles and larger objects with nanotextured surfaces may be coated with mixed composition SAMs using the techniques of the invention. In one embodiment, nanoparticles have a radius between 1 and 1000 nm. For example, the nanoparticles may have a radius between 1 and 10 nm, between 10 and 100 nm, or between 100 and 1000 nm. Nanoparticles of a desired size may be produced using any technique known to those skilled in the art. Exemplary methods of producing nanoparticles include but are not limited to those described in Cushing, B. L., et al., *Chem. Rev.* 2004, 104, 3893; Hiramatsu, H., et al., *Chem. Mater.* 2004, 16, 2509; Jana, N. R., et al., *J. Am. Chem. Soc.* 2003, 125, 14280; Hyeon, T., et al., *J. Am. Chem. Soc.* 2001, 123, 12798; Brust, M., et al., *Chem. Commun.* 1994, 801; Leff, D. V., et al., *Langmuir* 1996, 12, 4723; Osuna, J., et al., *J. Phys. Chem.* 1996, 100, 14571; Bardaji, M., et al., *New J. Chem.* 1997, 21, 1243; Zitoun, D., et al., *J. Phys. Chem. B* 2003, 107, 6997; Courty, A., et al.,*Adv. Mater.* 2001, 13, 254; Ely, T. O., et al., *Chem. Mater.* 1999, 11, 526; Stoeva, S., et al., *J. Am. Chem. Soc.* 2002, 124, 2305; O'Brien, S., et al., *J. Am. Chem. Soc.* 2001, 123, 12085; Caruntu, D., et al., *Inorg. Chem.* 2002, 41, 6137; Sun, S., et al., *J. Am. Chem. Soc.* 2002, 124, 8204; Rockenberger, J., et al., *J. Am. Chem. Soc.* 1999, 121, 11595; Rosetti, R., et al., *J. Chem. Phys.* 1985, 83; Dannhauser, T., et al.,*J. Phys. Chem.* 1953, 57, 670; Trindade, T., et al., *Chem. Mater.* 2001, 13, 3843; Stuczynski, S. M., et al., *Inorg. Chem.* 1989, 28, 4431; Lu, Y., et al., *Nano Lett.* 2005, 5, 5; Miles, D. T., et al., *Anal. Chem.* 2003, 75, 1251; Chen, S., et al., *J. Am. Chem. Soc.* 2001, 123, 10607; Puddephat, R. J. *The Chemistry of Gold*; Elsevier: Amsterdam, 1978; Laguna, A. In *Metal Clusters in Chemistry*; Braunstein, P., Oro, L., Raithby, P. R., Eds; Wiley-VCH: Weinheim, 1999; *Nanoparticles and Nanostructured Films*; Fendler, J. H., Ed.; Wiley-VCH: Weinheim, 1998; Schmid, G., et al., *Chem. Ber.* 1981, 114, 3634; Hasan, M., et al., *J. Am. Chem. Soc.* 2003, 125, 1132; Brown, L. O., et al., *J. Phys. Chem. B* 2001, 105, 8911-8916; Li, W., et al., *Colloids Surf* 2000, 175, 217; Kanehara, M., et al., *J. Am. Chem. Soc.* 2003, 125, 8708; Sarathy, K. V., et al., *Chem. Commun.* 1997, 537, all of which are incorporated herein by reference.

Likewise a nanotextured surface, or nanosurface, may have features with a radius of curvature between 1 and 1000 nm, for example, between 1 and 10 nm, between 10 and 100 nm, or between 100 and 1000 nm. Often, a non-processed surface of a given substrate will have features in this range. However, where a surface does not exhibit texturing on this length scale, techniques well known to those skilled in the art, such as sanding, filing, plasma etching, chemical etching, and mechanical pitting (for example, by sandblasting), may be used to impart texture to a surface. The size scale of the texturing of the surface may be measured using profilometry and other techniques well known to those skilled in the art.

Both nanoparticles and nanotextured surfaces may be fabricated from any material to which a SAM will attach. As discussed below, different SAM anchor groups will attach to different materials. Practically any material, for example, metals, semiconductor materials, polymers, and ceramics, may be used. For example, nanoparticles or nanosurfaces may be fabricated on gold, silver, silicon, silica, calcium phosphate ceramics, alumina, and stainless steel. Many polymers, such as poly(vinyl alcohol), have native hydroxyl groups to which silanes and/or other molecules will bind to form a SAM. Where a material is not ordinarily conducive to the formation of a SAM, it may be modified to render it more receptive to a particular anchor group. For example, etching with an RF oxygen plasma establishes hydroxyl groups at the surface of many materials, e.g., polymers, that may be used to bind silanes or primary carboxylates to form a SAM. Non-hydroxylated polymers may be plasma etched to establish hydroxyl groups.

Formation of SAMs with Ordered Domains

Figure 1A:
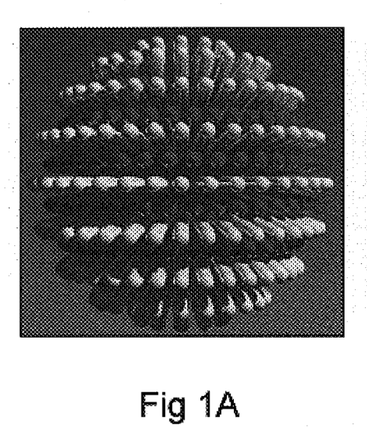
Figure 1B:
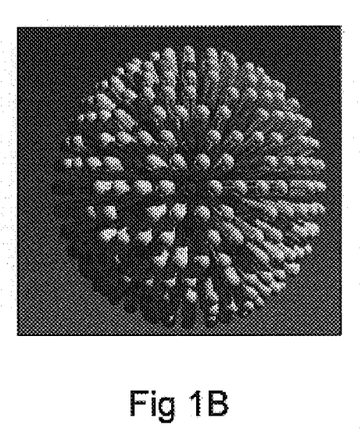
FIG. 1(b) is a diagram of ligand configuration in an "island" pattern (domain spacing is selected for clarity and does not necessarily reflect actual relative size of domains and particles)

We have found that subnanometer-ordered domains can be induced to form spontaneously on the ligand shell of MPNPs coated with mixtures of ligands in properly selected ratios. These ligands may form in sub-nanometer "ridges" around the nanoparticles, as illustrated in FIG. 1(*a*), or in sub-nanometer "islands," as illustrated in FIG. 1(*b*). The configuration of domains is dependent on the choice of ligands, the ligand ratio, and the nanoparticle curvature. Even where there is some mixing of the ligands within a domain, the distinct domains are still able to form.

The ligands themselves may include any molecule capable of forming a SAM. In general, SAM—forming molecules have three sections—an anchor, a tether, and an end group.

The anchor retains the molecule on a substrate. The tether extends out from the anchor in a linear chain, for example, a hydrocarbon chain. The tether is generally inert with respect to subsequent processing steps or interactions, although it is not required to be so. Any tether that does not disrupt SAM packing and that allows the SAM layer to be somewhat impermeable to various reagents (e.g., etchants) or organic or aqueous environments is suitable. The tether may be polar, non-polar, halogenated (e.g., with fluorine), positively charged, negatively charged, or uncharged. For example, a saturated or unsaturated, linear or branched alkyl, aryl, or other hydrocarbon spacer may be used. Any combination of these functional groups may also be used in the tether. Exemplary tethers include long chain (e.g., $C_4$-$C_{17}$ or more) hydrocarbon groups.

An end group is at the opposite end of the molecule from the anchor, adjacent to the tether, and comprises a functionality which confers a specific surface property on the assembled monolayer, which functionality is typically exposed when the SAM is formed. End groups with hydroxyl or amine moieties will tend to be hydrophilic, while halogenated and aliphatic groups will tend to be hydrophobic. Aromatic groups contribute to specific chemical interactions and are also photoactive. Alternatively, if no specific terminal group is chosen, the end of the tether essentially forms the end group. For example, hydrocarbon tethers present a methyl end group, while a halogenated or hydroxylated hydrocarbon will present a halogenated or hydroxylated end group. In one embodiment, a functional group is retained on the last few carbons of the anchor, so that the end group of the molecule is not a single group but is a section of the molecule, for example, the last three carbons of 1-trifluoro-2,3-difluorooctanesilane. The end group may be hydrophobic or hydrophilic or selectively bind various biological or other chemical species. For example, ionic, non-ionic, polar, non-polar, halogenated, alkyl, alkenyl, alkynyl, aryl or other functionalities may be exploited as part of the end group. A non-limiting, exemplary list of such functional groups includes those employed as tether groups as well as: —OH, —CONH—, —CONHCO—, —NH$_2$, —NH—, —COOH, —COOR, —CSNH—, —NO$_2$—, —SO$_2^-$, —RCOR—, —RCSR—, —RSR, —ROR—, —PO$_4^{3-}$, OSO$_3^{-2}$, —SO$_3^-$, PO$_3^{2-}$, NH$_x$R$_{4-x}^+$, —COO$^-$, —SOO$^-$, —RSOR—, —CONR$_2$, —SO$_3$H, —(OCH$_2$CH$_2$)$_n$OH (where n=1-20), —CH$_3$, —PO$_3$H$^-$, -2-imidazole, —N(CH$_3$)$_2$, —NR$_2$, —PO$_3$H$_2$, —CN, —(CF$_2$)$_n$CF$_3$ (where n=1-20), olefins, hydrocarbons, etc. In the above list, R is hydrogen or an organic group such as a hydrocarbon or fluorinated hydrocarbon. As used herein, the term "hydrocarbon" includes aliphatic, aromatic, cyclic, polycyclic, unsubstituted, and substituted organics, e.g., alkyl, alkenyl, alkynyl, cycloalkyl, aryl, alkaryl, aralkyl, etc. The hydrocarbon group may, for example, comprise a methyl, propenyl, ethynyl, cyclohexyl, phenyl, tolyl, naphthyl, and benzyl group. The term "fluorinated hydrocarbon" is meant to refer to partially and fully fluorinated derivatives, in addition to perfluorinated derivatives of the above-described hydrocarbon groups. A wide variety of functionalities that may be used to modify the chemical properties are described in U.S. Pat. No. 5,776,748, the entire contents of which are incorporated herein by reference.

In one embodiment, the anchor group has a single functionality that attaches to the substrate, for example, amine or dimethyl-methoxysilane. Any anchor group that is used to anchor a SAM may be used to form a monolayer protective coating using the techniques of the invention. For example, organosilanes may be deposited on silicon, glass, fused silica, or any substrate with an oxidized surface, for example, silica, alumina, calcium phosphate ceramics, and hydroxylated polymers. Carboxylic acids may also be used as anchors to oxidized substrates such as silica, alumina, quartz, glass, and other oxidized surfaces, including oxidized polymeric surfaces. Metals such as gold, silver, copper, cadmium, zinc, palladium, platinum, mercury, lead, iron, chromium, manganese, tungsten, and alloys of these may be patterned by forming thiol, sulfide, and disulfide bonds with molecules having sulfur-containing anchor groups. In addition, molecules may be attached to aluminum substrates via a phosphonic acid (PO$_3^{2-}$) anchor. Nitriles and isonitriles may be used to attach molecules to platinum and palladium, and copper and aluminum may be coated with a SAM via a hydroxamic acid. Other functional groups available suitable for use as anchors include acid chlorides, anhydrides, sulfonyl groups, phosphoryl and phosphonic groups, hydroxyl groups, and amino acid groups.

Of course, SAMs may be deposited on semiconductor materials such as germanium, gallium, arsenic, and gallium arsenide. Unoxidized polymeric materials, especially those having electron-rich elements in their backbones or side chains, may also be used as substrates. Exemplary materials include epoxy compounds, polysulfones, acrylonitrile-butadiene-styrene copolymers, and biodegradable polymers such as polyanhydrides, polylactic acid, polyglycolic acid, and copolymers of these materials. Non-conductive materials may also be used as substrates.

The appropriate length of the tether and end group is determined by several factors, including the radius of curvature of the substrate and the other ligand or ligands in the mixture. In one embodiment, the length of the ligand is within about an order of magnitude of the radius of curvature of the substrate surface. Where ligands are mixed in a ratio to form band-like domains on a nanosurface or nanoparticle, it may be undesirable to have one ligand be so much longer than the other ligand that it bends over and covers the second ligand.

Mixed ligands will form domains on the surface so long as they differ in length from one another. The difference in length need not be great and can be as small as one methylene group or other moiety in the chain (e.g., a secondary amine). It is not necessary that the ligands differ from one another in end group composition to form domains, although a difference in composition may enhance the ability of the MPNS or MPNP to repel proteins. Without wishing to be bound by any particular theory, it is believed that the organization of ligands on a curved surface is determined by the length of the projection of the individual ligands, which extend out from the surface at an angle, on the surface. The ligands organize themselves in domains according to the length of the projection. Because the surface is curved, domains cannot extend very far in two dimensions because the extended ligands will not actually be pointing in the same direction. To cover the surface and maintain the energetic advantages of self assembly, the ligands organize themselves in domains by height. We have demonstrated that mixed SAMs using hydrocarbon-thiol ligands of different lengths still organize themselves into domains. Where one ligand is excessively longer than another, for example, by more than ten methylene groups, the SAM phase formed by that ligand may bend over the other ligand. The relative ratios of the two ligands determines the shape of the domains. For example, ligands in a ratio of about 10:1 will form approximately hexagonal domains. More evenly proportioned mixtures will result in the formation of alternating stripes of each ligand, as if the domains were parallel latitude lines on a globe.

When the ligand mixture is selected to include both hydrophilic and hydrophobic ligands, the ridges form extremely fine-scale alternating hydrophilic-hydrophobic domains, which are found to exhibit exceptionally low non-specific adsorption of proteins. We have found that domains characterized by a width of between 0.2 nm to 10 nm, for example, 0.2 to 1 nm, 1 nm to 5 nm, or 5 nm to 10 nm, prevent non-specific adsorption of proteins to the surface. Without wishing to be bound by any particular explanation, it is currently believed that this feature stems from the fact that the domain size of the MPNPs is sufficiently small that there is no conformation of the protein that is only attracted to or only repelled by the MPNP. As a result, there is a series of attractive and repulsive forces between the protein's outer shell and the particle's domains, and consequently, there is almost no net attraction between the protein and the particle. Protein adsorption from solution is thus not thermodynamically favorable. Moreover, inhibition of protein adsorption also inhibits cellular adsorption because cells adsorb onto a surface through proteins in their cell coats. Likewise, viruses have a protein coat whose adsorption onto surfaces may be prevented using an appropriate surface treatment.

It is not necessary that one ligand be hydrophilic and the other hydrophobic. Rather, protein adsorption is inhibited where the two ligands have different hydrophilicities. The comparative hydrophilicity or hydrophobicity of two ligands may be determined by comparing the contact angle of a drop of water deposited on a SAM of each ligand. In one embodiment, the contact angles for the two ligands differ by at least one degree, for example by at least three degrees, at least five degrees, or at least seven degrees.

As further discussed below, one factor that influences the creation and size of subnanometer-ordered domains on MPNPs is the curvature of the nanoparticle surface. Subnanometer-ordered domains can also be formed on surfaces that have an arbitrary curvature on a macroscopic scale, if those surfaces have a local radius of curvature on the nanometer scale (hereinafter, "nanosurfaces" or MPNSs). Such surfaces can be formed by the adhesion of nanoparticles to a flat or curved surface, or by any other nanoscale "roughening" of the surface that produces a desired local radius of curvature. Because radii of curvature of about 1000 nm are appropriate for use in this invention, standard texturing techniques such as sanding, chemical etching, sandblasting, dewetting, etc. may be used to texture the surface. Indeed, many surfaces may already have surface texture of a size scale appropriate for use with the teachings of the invention. Profilometry may be used to determine the surface roughness of a potential substrate.

The resistance of MPNPs and MPNSs to protein adsorption allows them to be used for a wide variety of applications where protein adsorption is undesired. For example, MPNPs may be applied to surfaces of vessels or columns used in protein assays to avoid contamination, to medical devices (such as surgical implants), to filters, or to other implements exposed to biological fluids. The surfaces of these objects may also be rendered nanostructured, for example by chemical, electrochemical, or physical means, and coated with ligands to form MPNSs.

In one embodiment, the surfaces of medical devices are treated to form MPNSs. Medical devices are grouped by the FDA according to the amount of time they will be inside the body. Devices that are designed to remain in the body for days or even just hours may benefit from an MPNS or an MPNP coating. Proteins will being to deposit on most materials immediately after insertion into the body. Sensors that are designed to repeatedly make a particular measurement may need to be recalibrated over time because adsorbed proteins interfere with a particular measurement. Alternatively, the performance of the sensor may decrease over time because protein adsorption reduces the signal to noise ratio of the sensor. For sensors that measure the intensity or wavelength of a particular electromagnetic emission or an electrical potential, a thin SAM can prevent the adsorption of proteins that degrade the measurement without themselves interfering with the sensor because they are too thin to interfere with an electrical potential and are transparent.

Many patients have to wear temporary shunts, tubes, or other devices that provide continuous access to the interior of the body for a specific period of time. These shunts may become clogged over time, or the development of a protein coat may provide a substrate on which bacteria may proliferate and cause infection. The protein coat may also provide a favorable surface for platelet deposition, causing blood clots to form and increasing the patient's risk of a stroke. Shunts are also used for internal fluid transport, for example, as artificial arteries or to transport excess fluid from the brain to the kidneys. Similar devices, such as prosthetic heart valves, can also exhibit impaired performance as a result of protein adsorption. Thus, a monolayer protective coating on these devices can not only increase the performance of the device but can also help reduce a patient's risk from using the device.

Longer term implants can also find life-saving benefits in the use of MPNSs. Millions of "permanent" devices are implanted into patients every year. While these devices are intended to be permanent and usually are replaced when they fail, they are rarely truly permanent. One of the factors that limit the life of thee devices is protein adsorption. For example, stents are implanted into various blood vessels to facilitate blood circulation. However, protein adsorption onto the stent may cause clotting, reblocking blood flow and necessitating repeated surgeries to maintain the patient's circulation. The leads on pacemakers develop a thick protein coating over time, increasing the impedence on the circuit and reducing battery life. In addition, there may very well be potential medical devices whose development today is impractical because protein adsorption would severely impair the utility of the device. A protective coating such as those described herein could lead to the development of long term devices to treat or prevent a variety of ailments.

MPNSs and MPNPs may also be exploited to improve the efficiency of drug delivery. Even where a drug is injected directly into or near the target tissue, a large proportion of the injected drug will be non-specifically adsorbed by proteins and will not reach the target. However, small molecules and bioactive agents may be encapsulated using the techniques of the invention. In one embodiment, a drug is encapsulated using techniques known to those skilled in the art, and the capsule is coated with nanoparticles using the techniques of the invention. In another embodiment, nanoparticles are coated with a mixture of ligands according to the teachings of the invention, following which drug molecules are attached to the nanoparticle. For example, the ligand may include a functional group that reacts with the drug to covalently or non-covalently link it to the nanoparticle. Alternatively or in addition, the ligand may include a functional group that simulates a receptor that coordinates with the drug. Alternatively or in addition, a receptor molecule may be attached to either the drug or directly to the nanoparticle.

Monolayer protective coatings may also be exploited for non-implant related applications. For example, consumer objects may be coated to prevent protein adsorption on surfaces ranging from doorknobs to elevator buttons. Surfaces that are touched by multiple people each day facilitate the transfer of disease. Covering these surfaces with a coating that can prevent non-specific protein adsorption may help reduce transfer of disease causing microorganisms, which have proteins in their cell membranes and coats, from a person to the object. In addition, it may also increase the efficiency of standard cleaning solvents in removing bacteria and viruses from these surfaces. Because the SAM is covalently attached, it is not removed from the surface during cleaning. In one embodiment, the coating is made up of nanoparticles that are attached to one another and to the surface using difunctional anchoring molecules. For example, 3-mercaptopropyltrimethoxysiloxane has a sulfur atom that binds to a gold particle and a siloxane group that attaches the particle to a surface, while nonanedithiol can link two gold particles to one another. These molecules serve as a cross-linking group and may be included in quantities that do not disrupt the formation of aligned phases or domains. In one embodiment, their concentration may be comparable to the concentration of cross-linking agents in thermoplastic materials, e.g., a few percent.

Likewise, items that are partially or totally immersed in aqueous environments may also benefit from a monolayer coating. Ships are constantly having to be cleaned to remove both barnacles and other clinging shellfish and coatings of protein and algal sludge that collect on their hulls. These organisms increase drag on the ship and also degrade the surface of the hull, increasing corrosion. A coating that prevents adsorption of proteins on the ship can save both maintenance and fuel costs and increase the life of the ship. Other items, such as pipes for household plumbing, coolant lines for equipment, small nozzles, and any other item where water both flows and sits, depending on the frequency of demand, may also benefit from a monolayer coating.

EXAMPLES

Gold MPNPs were synthesized with a variety of starting materials, as detailed in Table 1. For each of the stoichiometries tested, 354 mg (0.9 mmol) of $HAuCl_4.3H_2O$ was dissolved in 50 ml of water and 2.187 (4 mmol) of $BrN((CH_2)_7CH_3)_4$ was dissolved in 80 ml of toluene. The two phases were mixed and left stirring for 30 min. Mixtures of ligands in the molar amounts specified in Table 1 were injected in the solution once the color due to the gold salt had transferred completely to the organic phase (ligand abbreviations are shown in Table 2). The solution was allowed to react for ten minutes and acquired a typical white color. A 10 mM solution (30 ml) of $NaBH_4$ was then added dropwise over one hour. After this addition, the solution was stirred for two hours. The phases were separated and the organic phase was collected, reduced to 10 ml, diluted with 100 ml of absolute ethanol, and placed in a refrigerator overnight. The precipitate was collected by vacuum filtration using quantitative paper filters and extensively washed with water, acetone, and ethanol. This process usually yielded about 100 mg of collected black powder. Nanoparticles soluble in ethanol were collected by vacuum evaporation of the ethanol solution and extensive rinsing with water, acetone, and toluene.

Silver MPNPs were synthesized by dissolving 152.9 mg (0.9 mmol) of $AgNO_3$ in 100 ml of ethanol followed by the addition of mixtures of the targeted ligands in the molar amounts specified in Table 1. The solution was kept at 0° C. After 10 minutes, a saturated solution (100 ml) of $NaBH_4$ was slowly added dropwise. After completion, the solution was stirred for 2 hours, brought to room temperature, and placed in a refrigerator overnight. Subsequent purification was the same as that described above for gold nanoparticles.

Table 1 shows the observed domain morphologies, ripple spacings (if applicable), solubilites, and metal nanoparticle diameters observed. Note that ripple spacing is peak-to-peak; i.e., the sum of the widths of one "stripe" of each ligand. Solubility definitions are as follows: "Highly soluble" indicates no precipitation visually observed, "Soluble" indicates little precipitation observed over time with consequent slight decoloration of the solution, "Slightly soluble" indicates most of sample precipitated but a small coloration of the solution remains, and "Insoluble" means that essentially all of the sample precipitated, leaving the solution visually colorless.

TABLE 1

| Metal | Ligand 1 | Ligand 2 | Metal: Ligand Molar Ratio | Ligand 1: Ligand 2 Molar Ratio | Morphology | Peak to Peak Spacing (nm) | Solubility Toluene | Solubility Ethanol | Average Core Size (nm) |
|---|---|---|---|---|---|---|---|---|---|
| Au | HT | MPA | 1:1 | 2:1 | Ripples | 0.95 | Highly soluble | Soluble | 3.5 |
| Au | OT | MPA | 1:1 | 2:1 | Ripples | 1 | Highly soluble | Insoluble | 3.8 |
| Au | DT | MPA | 1:1 | 2:1 | Ripples | 1 | Highly soluble | Slightly soluble | 3.5 |
| Au | DDT | MPA | 1:1 | 2:1 | Ripples | .55-.75 | Highly soluble | Insoluble | 3.5 |
| Au | OT | MUA | 1:1 | 2:1 | Ripples | 1 | Insoluble | Highly soluble | 3.7 |
| Au | DDT | MUA | 1:1 | 2:1 | Ripples | 0.62 | Insoluble | Soluble | 3.7 |
| Au | OT | MPA | 1:1 | 1:2 | Ripples | 0.66 | Highly soluble | Slightly soluble | 3.6 |
| Au | OT | MPA | 1:1 | 2:1 | Ripples | 1 | Highly soluble | Slightly soluble | 3.8 |
| Au | OT | MPA | 1:1 | 10:1 | Domains | N/A | Highly soluble | Slighly soluble | 3.5 |
| Au | OT | MUA | 1:1 | 2:1 | Ripples | 1 | Insoluble | Highly soluble | 3.7 |
| Au | OT | MUA | 1:1 | 5:1 | Domains | N/A | Slightly soluble | Highly soluble | 3.6 |
| Au | OT | MUA | 1:1 | 20:1 | Domains | N/A | Highly soluble | Insoluble | 3.6 |
| Au | OT | MPA | 1:1 | 2:1 | Ripples | 1 | Highly soluble | Insoluble | 3.8 |

TABLE 1-continued

| Metal | Ligand 1 | Ligand 2 | Metal: Ligand Molar Ratio | Ligand 1: Ligand 2 Molar Ratio | Morphology | Peak to Peak Spacing (nm) | Solubility Toluene | Solubility Ethanol | Average Core Size (nm) |
|---|---|---|---|---|---|---|---|---|---|
| Au | OT | MPA | 2:1 | 2:1 | Ripples | 0.82 | Highly soluble | Insoluble | 4.3 |
| Au | OT | MPA | 5:1 | 2:1 | Ripples | 0.73 | Highly soluble | Slightly soluble | 5.1 |
| Au | OT | MUA | 1:1 | 2:1 | Ripples | 1 | Insoluble | Highly soluble | 3.7 |
| Au | OT | MUA | 3:1 | 2:1 | Ripples | 0.8 | Insoluble | Highly soluble | 4.9 |
| Au | HT | APT | 1:1 | 1:2 | Ripples | 0.6 | Highly soluble | Insoluble | 3.5 |
| Au | OT | APT/MUA | 1:1 | 1:1:1 | Domains | N/A | Insoluble | Soluble | 3.6 |
| Au | OT | MPA | 3:1 | 30:1 |  | N/A | Highly soluble | Insoluble |  |
| Au | OT | MPA | 1:1 | Substituted | Partial ripples | 0.75 | Insoluble | Insoluble | 3.6 |
| Ag | OT | MPA | 1:1 | 2:1 | Ripples | 0.92 | Slightly soluble | Slightly soluble | 3.8 |

TABLE 2

| Abbreviation | Ligand |
|---|---|
| MPA | HOOC—$(CH_2)_2$—SH (mercaptopropionic acid) |
| MUA | HOOC—$(CH_2)_{10}$—SH (mercapto undecanoic acid) |
| APT | $H_2N$—$C_6H_4$—SH (4-amino thiophenol) |
| HT | $CH_3$—$(CH_2)_5$—SH (hexanethiol) |
| OT | $CH_3$—$(CH_2)_7$—SH (octanethiol) |
| DT | $CH_3$—$(CH_2)_9$—SH (decanethiol) |
| DDT | $CH_3$—$(CH_2)_{11}$—SH (duodecanethiol) |

Particles were examined by STM to determine domain morphology and spacing. STM samples were prepared by immersing a 1 cm² gold substrate (either gold foil or Au(111) thermally evaporated on mica) in 20 ml of a $5.6 \times 10^{-2}$ mM toluene solution of 1,8-octane-dithiol containing 2 mg nanoparticles for 24 hours. The dithiol was used to bind the nanoparticles to the substrate and to one another; this was found to be beneficial in imaging as the particles were immobilized and the STM tip could not be contaminated.

Figure 2:
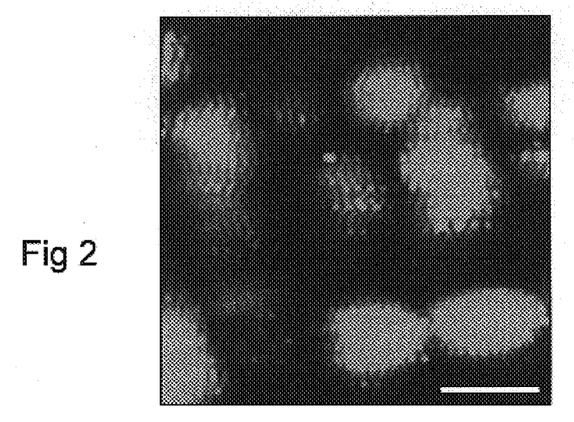
FIG. 2 is an STM image of OT/MPA (2:1 molar ratio) gold nanoparticles showing phase-separated ripples on their ligand shell (scale bar 10 nm)

As shown by the STM image of FIG. 2, gold particles synthesized in one step with a 2:1 OT/MPA molar composition present domains that align into parallel ripples that encircle and/or spiral around the nanoparticles, forming long channels with hydrophilic bottoms and hydrophobic walls. (The common alignment along multiple nanoparticles shown in FIG. 2 is believed to be due to interdigitation of ligands.) In contrast, STM images of homo-ligand nanoparticles lacked the rippled stripes and showed hexagonally packed head groups. The presence of ripples on the nanoparticles has also been confirmed using X-ray diffraction (XRD). XRD plots of rippled nanoparticles showed peaks at 2θ ranging from 2.5° to 13°. Some of the peaks were temperature dependent, as is expected for peaks due to inter-particle packing arrangements. However, some peaks were temperature independent, pointing to periodic arrangements, with 0.5-2.5 nm spacing, on single nanoparticles. Such temperature-independent peaks were not observed in homo-ligand nanoparticles. On heating the nanoparticles to 120° C. and subsequent gentle cooling and rinsing in toluene, dichloromethane, ethanol, acetone, and acetonitrile, ripple alignment across the sample was improved. SAMs deposited on gold foil and heated above 150° C. did not exhibit consistent ripple alignment.

Additional confirmation of the presence of ordered phase-separated domains was provided by transmission electron microscopy (TEM) images. In these images we have found that there is an observable ring around the nanoparticles' metallic cores consisting of discrete dots spaced ~0.5-0.6 nm. Ripples on silver particles formed with similar spacing to those on gold, suggesting that the formation of domains is not solely determined by the substrate material. In addition, by comparing the TEM images of metallic cores of MPMNs with the STM images of ligand shells of the same particles, we determined that the crystallographic nature of the metal is not a determining factor for domain formation.

Figure 3:
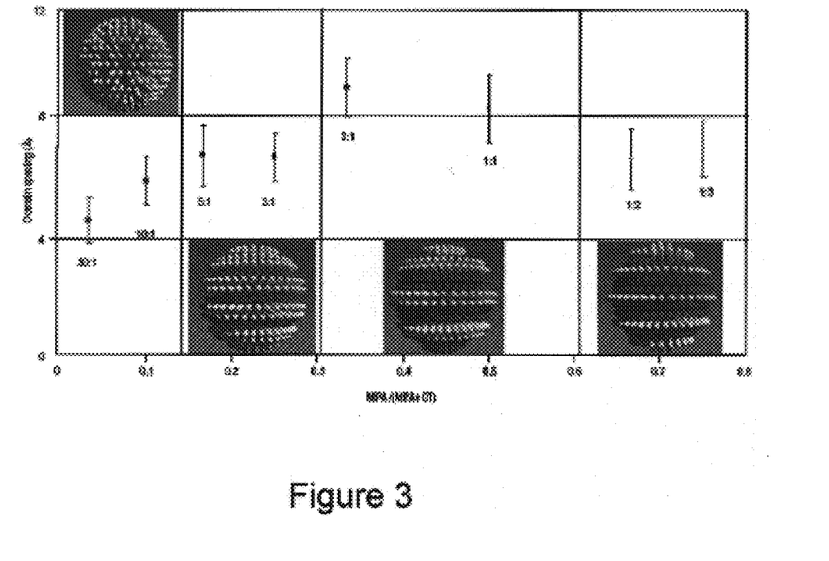
FIG. 3 is a plot of domain spacing vs. MPA fraction used in a one-step synthesis of gold nanoparticles having an average diameter of about 3.7 nm.

One property of these nanoparticles is that the morphology of the ligand shell can be easily tailored. By simply varying the stoichiometry of the reagents during the one-step synthesis, it is possible to control and change the height difference, the spacing and the shape of the phase-separated domains, that is, the resulting exterior shape of the nanoparticle. We varied the height difference between the peaks and valleys of the ripples by synthesizing nanoparticles with MPA and one type of n-alkane thiol ($CH_3$—$(CH_2)_n$—SH, where n=5, 7, 9, 11) in a 1:2 molar ratio; all of the particles showed ripples and, as expected, the spacing remained constant. (As the term is used herein, interdomain spacing is the distance between one peak and the next one in the ripples on the MPNP surface. It should be noted that this distance is a measure not of one single domain, but of the total width of one OT and one MPA domain.) We then varied the spacing between the ripples by first changing the metallic core size, while keeping the ligand (OT/MPA) ratio constant, and found that peak-to-peak distance decreases as the nanoparticle diameter increases. Without wishing to be bound by any particular explanation, we believe that this is because the radius of curvature imposes the relative angle between one OT domain and the next, and this angle decreases with increasing core diameter. Even more strikingly, by varying the ligand ratio while keeping the core size constant, we found that we can change the peak-to-peak distance in quantized increments of ~3 Å (see FIG. 3). The global domain morphology could also be controlled by varying the ligand ratio, going from perfect ripples to defect-rich ripples to discrete domains. In the case of OT/MPA mixtures, we have observed that for extreme compositions in which one molecule is present in small amounts, discrete and ordered domains of the lesser component form in a percolated matrix of the more abundant one. This behavior has some striking similarities to that of block copolymers (albeit at a much smaller length scale); the ripples are analogous to the lamellar phase.

The formation of phase-separated domains on nanoparticles is not confined to specific molecular mixtures or intermolecular forces. We synthesized a series of nanoparticles coated with alkane thiols and a longer carboxylic-acid-terminated thiolated molecule (mercapto undecanoic acid, MUA). All of the synthesized particles showed ordered domains. Nanoparticles that had a 2:1 molar ratio of dodecanethiol to MUA, two molecules that are approximately the same length, showed ripples, proving that the relative height difference is not the sole factor in determining ripple formation. Nanoparticles coated with a binary mixture of OT and 4-amino thiophenol in a 1:1 molar ratio showed clear evidence of ripples with a 0.6-nm spacing. This demonstrates that the phase-separated domains form also in the case of intermolecular forces such as $\pi$-$\pi$ interactions.

Figure 4:
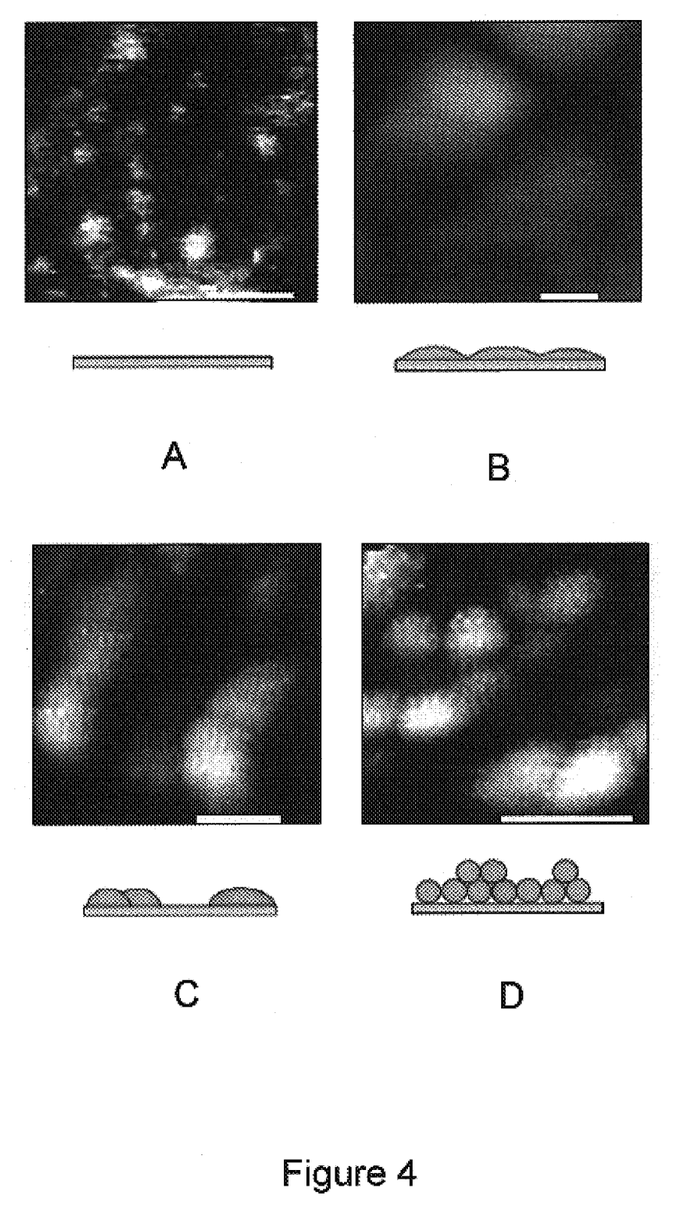
FIG. 4 is a series of STM images of mixed OT/MPA monolayers formed on surfaces of varying curvature, also shown schematically. A) A flat Au(111) on mica substrate, B) A gold film deposited on a silicon wafer showing bumps of about 20 nm diameter, C) A gold film containing gold crystals of about 10 nm diameter, D) A gold film with 5 nm gold crystals on it. All scale bars are 10 nm.

To produce a broader size and curvature range, we prepared surfaces covered with small gold hemispheres of varying diameters. Mixed SAMs were formed on gold thermally evaporated on silicon, which presents a high density of 20-nm-diameter hemispheres of, on average, 4 nm in height. Because of the low curvature of the substrate, there was no domain ordering. To better approximate the curvature present on nanoparticle surfaces, nanoparticle submonolayers were prepared on gold on mica substrates and then processed so as to completely remove their ligands by heating under vacuum at 170° C. for 1 hr or by irradiating with UV light for 8 hours, resulting in gold hemispheres about 4 nm in diameter and height. When mixed monolayers were assembled on these surfaces, ordered ripples spontaneously formed only on the curved part of the substrate (FIG. 4.).

To show that the monolayers prepared according to the techniques of the invention are resistant to non-specific protein adsorption, we choose three proteins: 1) cytochrome C, a medium-sized protein known to bind strongly to both OT and MPA homo- and mixed monolayers (Hobara, et al., *Nano Lett.* (2002), 2, 1125-1129), 2) lysozyme, a small, positively charged (pH 7.4) and rigid protein known not to unfold when adsorbing on hydrophilic monolayers (Satulovsky, et al., *Proc. Natl. Acad. Sci. USA*, (2000), 97, 9037-9041), and 3) fibrinogen, a large protein present in blood plasma that adsorbs strongly to hydrophobic surfaces by unfolding (Kidoaki, et al., *Langmuir* (1999), 15, 7639-7646). Cytochrome C was adsorbed on the SAMs by immersing the monolayers for 24 hr in a solution of 127 mmol NaCl, 2.7 mmol KCl, and 10 mmol phosphate buffer (200 ml water, pH 7.4) containing 197.6 mg (0.016 mmol) cytochrome C. Lysozyme adsorption was performed by incubating the monolayers in 0.1 mg lysozyme/1 ml PBS for 24 hr. Fibrinogen adsorption was performed by incubating the substrates in a 0.5 mg fibrinogen/1 ml PBS for 24 hr. All substrates were subsequently rinsed with PBS and purified water and dried under air. Using STM, atomic force microscopy, and Fourier-transform infrared spectroscopy, we confirmed that all of these proteins adsorb on MPA, OT, and on mixed MPA-OT monolayers. The same behavior occurs on OT homo-ligand nanoparticle films, but the proteins do not adsorb on rippled or domained MPA/OT nanoparticle films, even after 24 hour exposure to a concentrated solution.

Mixed ligand OT/MPA nanoparticles were also synthesized by a two step procedure. First, OT homo-ligand nanoparticles were synthesized by the one-step procedure described above. 50 mg of the resulting nanoparticles were then dissolved in 45 ml toluene and 5 ml MPA. The solution was stirred for 24 hr, followed by centrifugation to remove unsubstituted ligands. We observed ripples with the same spacing as those formed on nanoparticles synthesized in only one step.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of creating a monolayer-protected surface, comprising:
   providing a surface having a local radius of curvature of less than or about equal to 1000 nanometers; and
   attaching by self-assembly a first ligand and a second ligand to the surface, wherein the first and second ligands are of different chain length and are selected and attached so as to form ordered domains having a characteristic size of less than or about equal to 10 nanometers, wherein the surface is the surface of a nanoparticle.

2. A method of creating a monolayer-protected surface, comprising:
   providing a surface having a local radius of curvature of less than or about equal to 1000 nanometers; and
   attaching by self-assembly a first ligand and a second ligand to the surface, wherein the first and second ligands are of different chain length and are selected and attached so as to form ordered domains having a characteristic size of less than or about equal to 10 nanometers, wherein providing a surface comprises providing a textured surface.

3. A method of creating a monolayer-protected surface, comprising:
   providing a surface having a local radius of curvature of less than or about equal to 1000 nanometers; and
   attaching by self-assembly a first ligand and a second ligand to the surface, wherein the first and second ligands are of different chain length and are selected and attached so as to form ordered domains having a characteristic size of less than or about equal to 10 nanometers, wherein providing a surface comprises providing a textured surface, and
   wherein providing a textured surface comprises sanding, chemical etching, sandblasting, or dewetting.

4. A method of creating a monolayer-protected surface, comprising:
   providing a surface having a local radius of curvature of less than or about equal to 1000 nanometers; and
   attaching by self-assembly a first ligand and a second ligand to the surface, wherein the first and second ligands are of different chain length and are selected and attached so as to form ordered domains having a characteristic size of less than or about equal to 10 nanometers, wherein the ordered domains define parallel strips on said surface.

5. A method of creating a monolayer-protected surface, comprising:
   providing a surface having a local radius of curvature of less than or about equal to 1000 nanometers; and
   attaching by self-assembly a first ligand and a second ligand to the surface, wherein the first and second ligands are of different chain length and are selected and attached so as to form ordered domains having a characteristic size of less than or about equal to 10 nanometers, wherein the ordered domains define a mosaic of hexagonal domains on said surface.

6. A method of creating a monolayer-protected surface, comprising:
providing a surface having a local radius of curvature of less than or about equal to 1000 nanometers; and
attaching by self-assembly a first ligand and a second ligand to the surface, wherein the first and second ligands are of different chain length and are selected and attached so as to form ordered domains having a characteristic size of less than or about equal to 10 nanometers, wherein the first and second ligands differ in length by not more than the length of a chain of 10 methylene groups.

7. A method of creating a monolayer-protected surface, comprising:
providing a surface having a local radius of curvature of less than or about equal to 1000 nanometers; and
attaching by self-assembly a first ligand and a second ligand to the surface, wherein the first and second ligands are of different chain length and are selected and attached so as to form ordered domains having a characteristic size of less than or about equal to 10 nanometers, wherein the first and second ligands, when deposited as SAMs on a flat surface, exhibit contact angles with water that differ by at least 1 degree.

8. A method of creating a monolayer-protected surface, comprising:
providing a surface having a local radius of curvature of less than or about equal to 1000 nanometers; and
attaching by self-assembly a first ligand and a second ligand to the surface, wherein the first and second ligands are of different chain length and are selected and attached so as to form ordered domains having a characteristic size of less than or about equal to 10 nanometers, wherein the first and second ligands, when deposited as SAMs on a flat surface, exhibit contact angles with water that differ by at least 3 degrees.

9. A method of creating a monolayer-protected surface, comprising:
providing a surface having a local radius of curvature of less than or about equal to 1000 nanometers; and
attaching by self-assembly a first ligand and a second ligand to the surface, wherein the first and second ligands are of different chain length and are selected and attached so as to form ordered domains having a characteristic size of less than or about equal to 10 nanometers, wherein the first and second ligands, when deposited as SAMs on a flat surface, exhibit contact angles with water that differ by at least 5 degrees.

10. A method of creating a monolayer-protected surface, comprising:
providing a surface having a local radius of curvature of less than or about equal to 1000 nanometers; and
attaching by self-assembly a first ligand and a second ligand to the surface, wherein the first and second ligands are of different chain length and are selected and attached so as to form ordered domains having a characteristic size of less than or about equal to 10 nanometers, wherein the first and second ligands, when deposited as SAMs on a flat surface, exhibit contact angles with water that differ by at least 7 degrees.

11. A monolayer-protected article, comprising:
an article having a surface, at least a portion of the surface having a local radius of curvature of about 1000 nm or less; and
a monolayer coating of self-assembling molecules on the portion, wherein the monolayer comprises a plurality of ligands organized into ordered domains having a characteristic size of less than or about equal to ten nanometers, wherein at least two ligands are of different chain length, wherein the article is a nanoparticle.

12. A monolayer-protected article, comprising:
an article having a surface, at least a portion of the surface having a local radius of curvature of about 1000 nm or less; and
a monolayer coating of self-assembling molecules on the portion, wherein the monolayer comprises a plurality of ligands organized into ordered domains having a characteristic size of less than or about equal to ten nanometers, wherein at least two ligands are of different chain length, wherein the surface is textured.

13. A monolayer-protected article, comprising:
an article having a surface, at least a portion of the surface having a local radius of curvature of about 1000 nm or less; and
a monolayer coating of self-assembling molecules on the portion, wherein the monolayer comprises a plurality of ligands organized into ordered domains having a characteristic size of less than or about equal to ten nanometers, wherein at least two ligands are of different chain length, wherein the ordered domains define parallel strips on the portion.

14. A monolayer-protected article, comprising:
an article having a surface, at least a portion of the surface having a local radius of curvature of about 1000 nm or less; and
a monolayer coating of self-assembling molecules on the portion, wherein the monolayer comprises a plurality of ligands organized into ordered domains having a characteristic size of less than or about equal to ten nanometers, wherein at least two ligands are of different chain length, wherein the ordered domains define a mosaic of hexagonal domains on said portion.

15. A monolayer-protected article, comprising:
an article having a surface, at least a portion of the surface having a local radius of curvature of about 1000 nm or less; and
a monolayer coating of self-assembling molecules on the portion, wherein the monolayer comprises a plurality of ligands organized into ordered domains having a characteristic size of less than or about equal to ten nanometers, wherein at least two ligands are of different chain length, wherein the monolayer coating comprises two ligands differing in length by not more than the length of a chain of 10 methylene groups.

16. A monolayer-protected article, comprising:
an article having a surface, at least a portion of the surface having a local radius of curvature of about 1000 nm or less; and
a monolayer coating of self-assembling molecules on the portion, wherein the monolayer comprises a plurality of ligands organized into ordered domains having a characteristic size of less than or about equal to ten nanometers, wherein at least two ligands are of different chain length, wherein the monolayer coating comprises two ligands that, when deposited as SAMs on a flat surface, exhibit contact angles with water that differ by at least 1 degree.

17. A monolayer-protected article, comprising:
an article having a surface, at least a portion of the surface having a local radius of curvature of about 1000 nm or less; and a monolayer coating of self-assembling molecules on the portion, wherein the monolayer comprises a plurality of ligands organized into ordered domains having a characteristic size of less than or about equal to ten nanometers, wherein at least two ligands are of different chain length, wherein the monolayer coating comprises two ligands that, when deposited as SAMs on a flat surface, exhibit contact angles with water that differ by at least 3 degrees.

18. A monolayer-protected article, comprising:
an article having a surface, at least a portion of the surface having a local radius of curvature of about 1000 nm or less; and
a monolayer coating of self-assembling molecules on the portion, wherein the monolayer comprises a plurality of ligands organized into ordered domains having a characteristic size of less than or about equal to ten nanometers, wherein at least two ligands are of different chain length, wherein the monolayer coating comprises two ligands that, when deposited as SAMs on a flat surface, exhibit contact angles with water that differ by at least 5 degrees.

19. A monolayer-protected article, comprising:
an article having a surface, at least a portion of the surface having a local radius of curvature of about 1000 nm or less; and
a monolayer coating of self-assembling molecules on the portion, wherein the monolayer comprises a plurality of ligands organized into ordered domains having a characteristic size of less than or about equal to ten nanometers, wherein at least two ligands are of different chain length, wherein the monolayer coating comprises two ligands that, when deposited as SAMs on a flat surface, exhibit contact angles with water that differ by at least 7 degrees.

20. A monolayer-protected article, comprising:
an article having a surface, at least a portion of the surface having a local radius of curvature of about 1000 nm or less; and
a monolayer coating of self-assembling molecules on the portion, wherein the monolayer comprises a plurality of ligands organized into ordered domains having a characteristic size of less than or about equal to ten nanometers, wherein at least two ligands are of different chain length, wherein the monolayer-protected surface is resistant to non-specific protein adsorption.

21. A monolayer-protected article, comprising:
an article having a surface, at least a portion of the surface having a local radius of curvature of about 1000 nm or less; and
a monolayer coating of self-assembling molecules on the portion, wherein the monolayer comprises a plurality of ligands organized into ordered domains having a characteristic size of less than or about equal to ten nanometers, wherein at least two ligands are of different chain length, wherein the article is selected from the group consisting of a medical device, a surgical instrument, a surgical implant, and an encapsulated drug.

* * * * *

UNITED STATES PATENT AND TRADEMARK OFFICE
CERTIFICATE OF CORRECTION

PATENT NO.      : 7,597,950 B1                            Page 1 of 1
APPLICATION NO. : 11/363907
DATED           : October 6, 2009
INVENTOR(S)     : Stellacci et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 594 days.

Signed and Sealed this

Twenty-eighth Day of September, 2010

David J. Kappos
*Director of the United States Patent and Trademark Office*